May 16, 1933. H. G. JOHNSON 1,909,181
COP WINDING MACHINE
Filed March 13, 1929 9 Sheets-Sheet 1
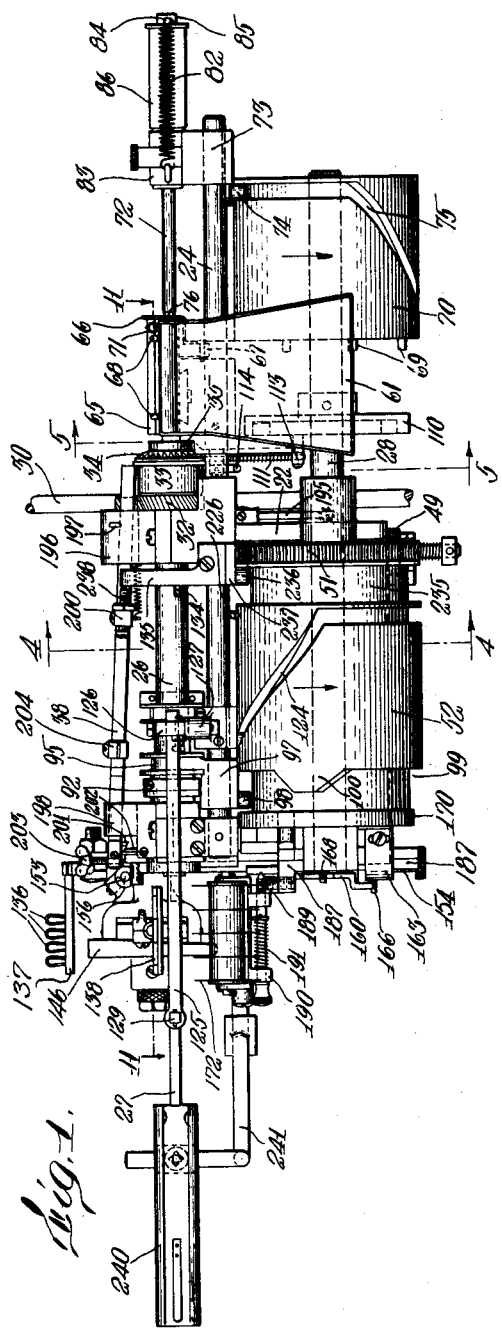
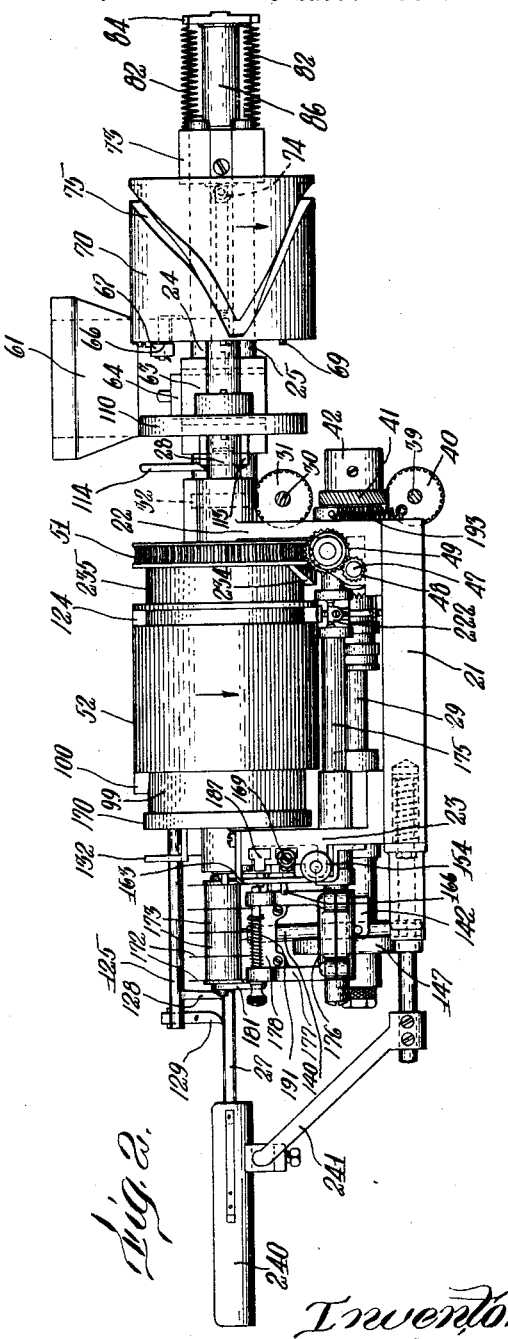
Inventor
Henry G. Johnson

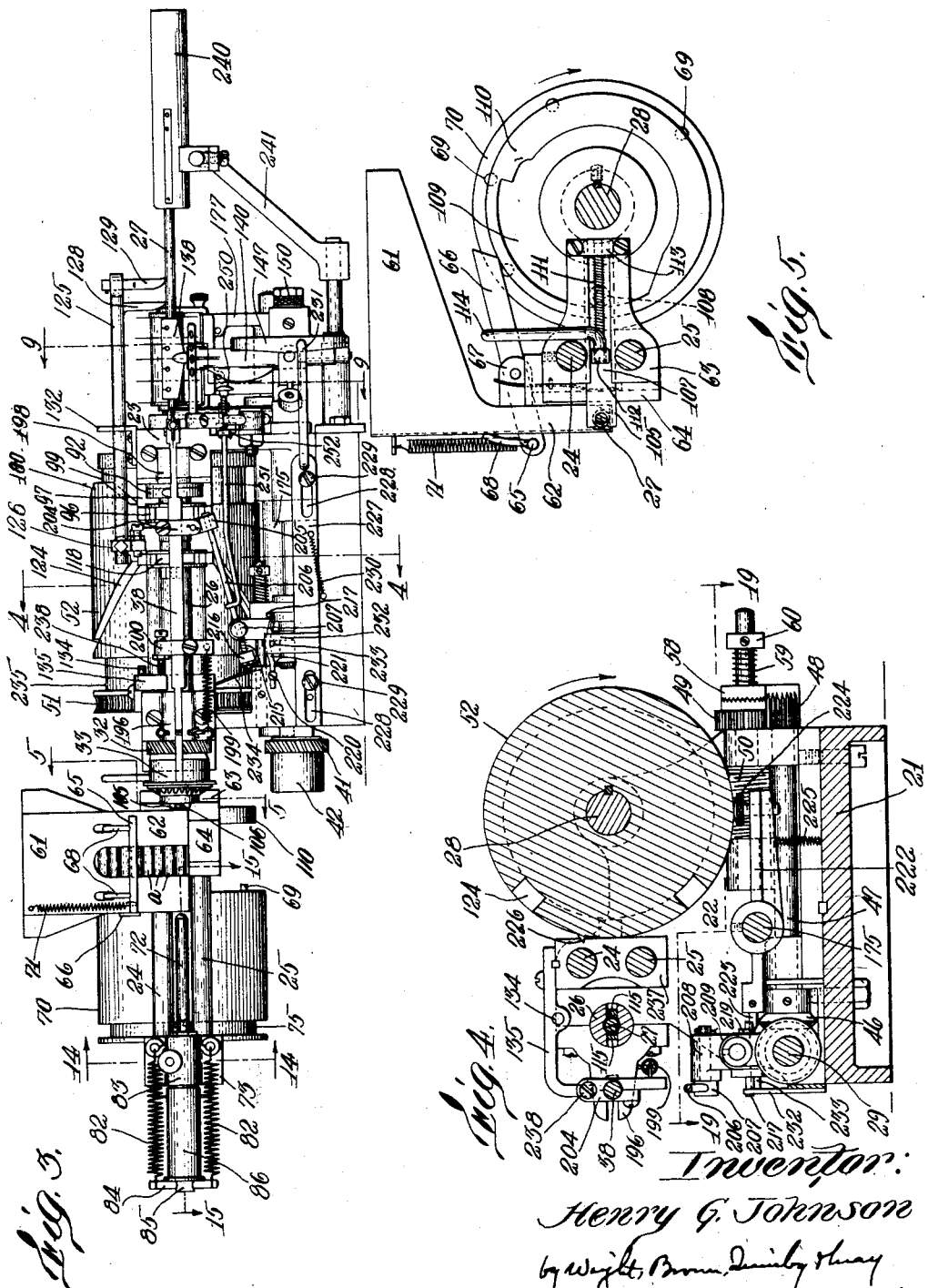

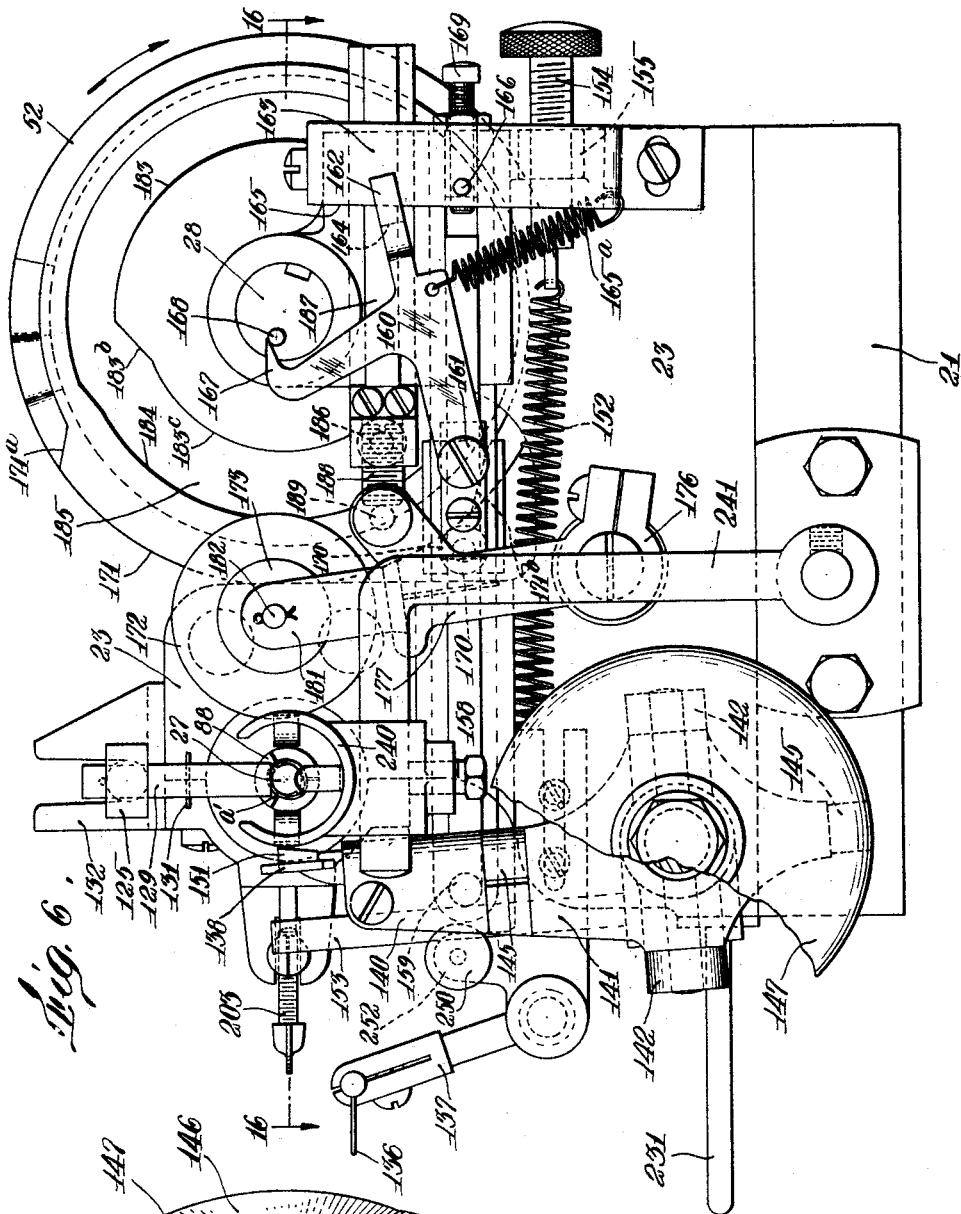
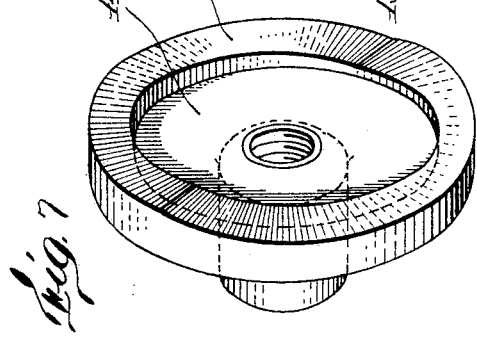

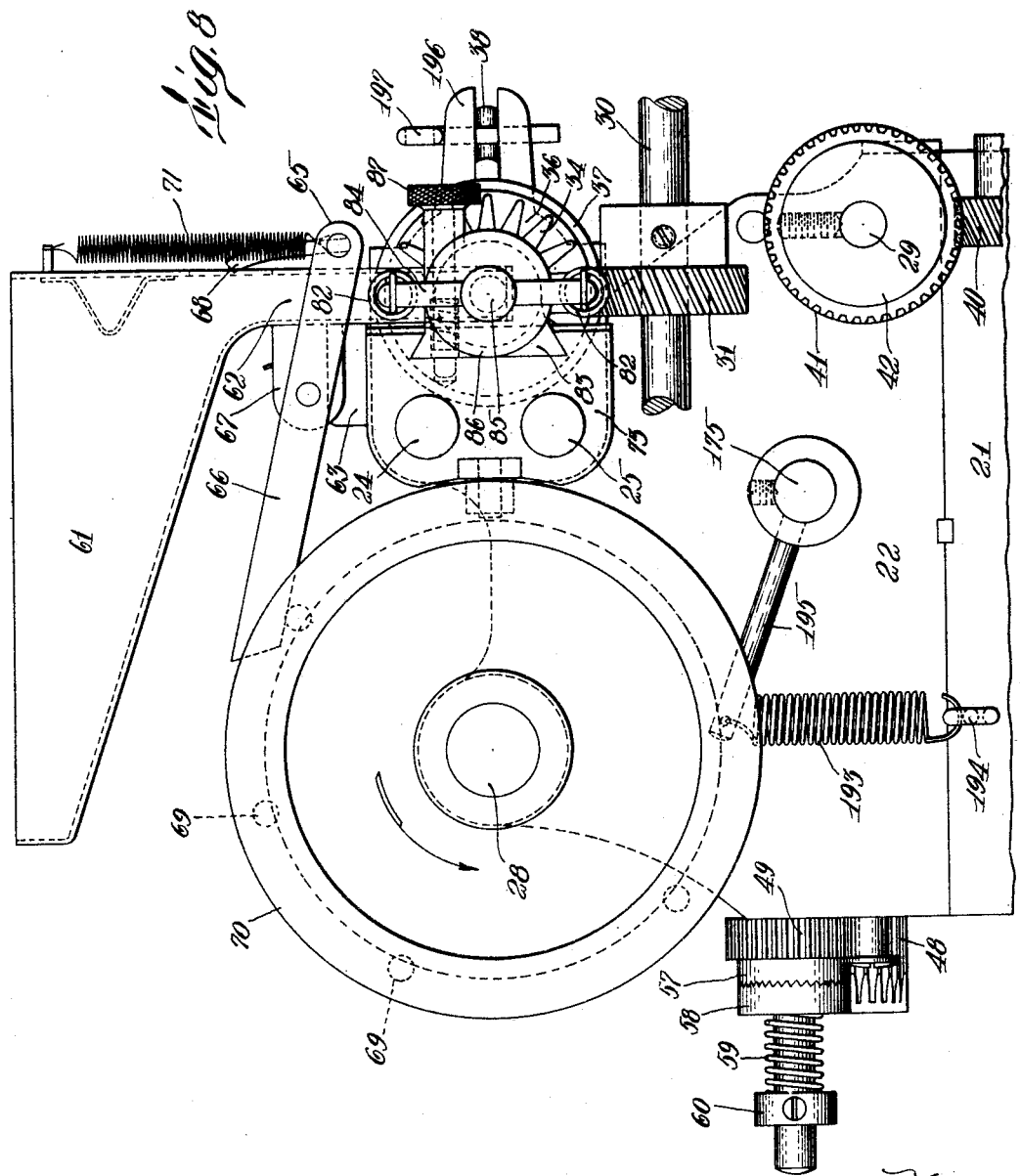

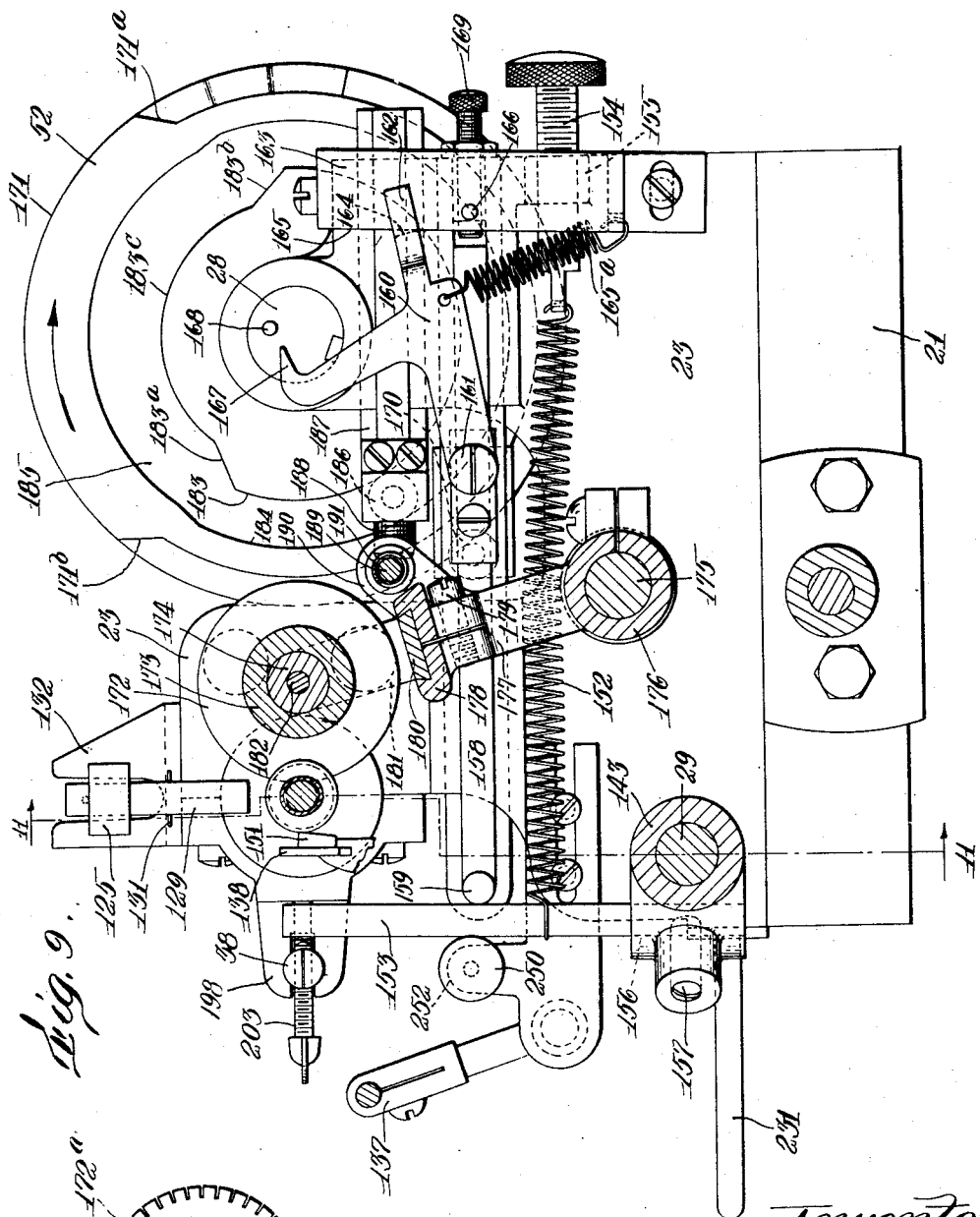

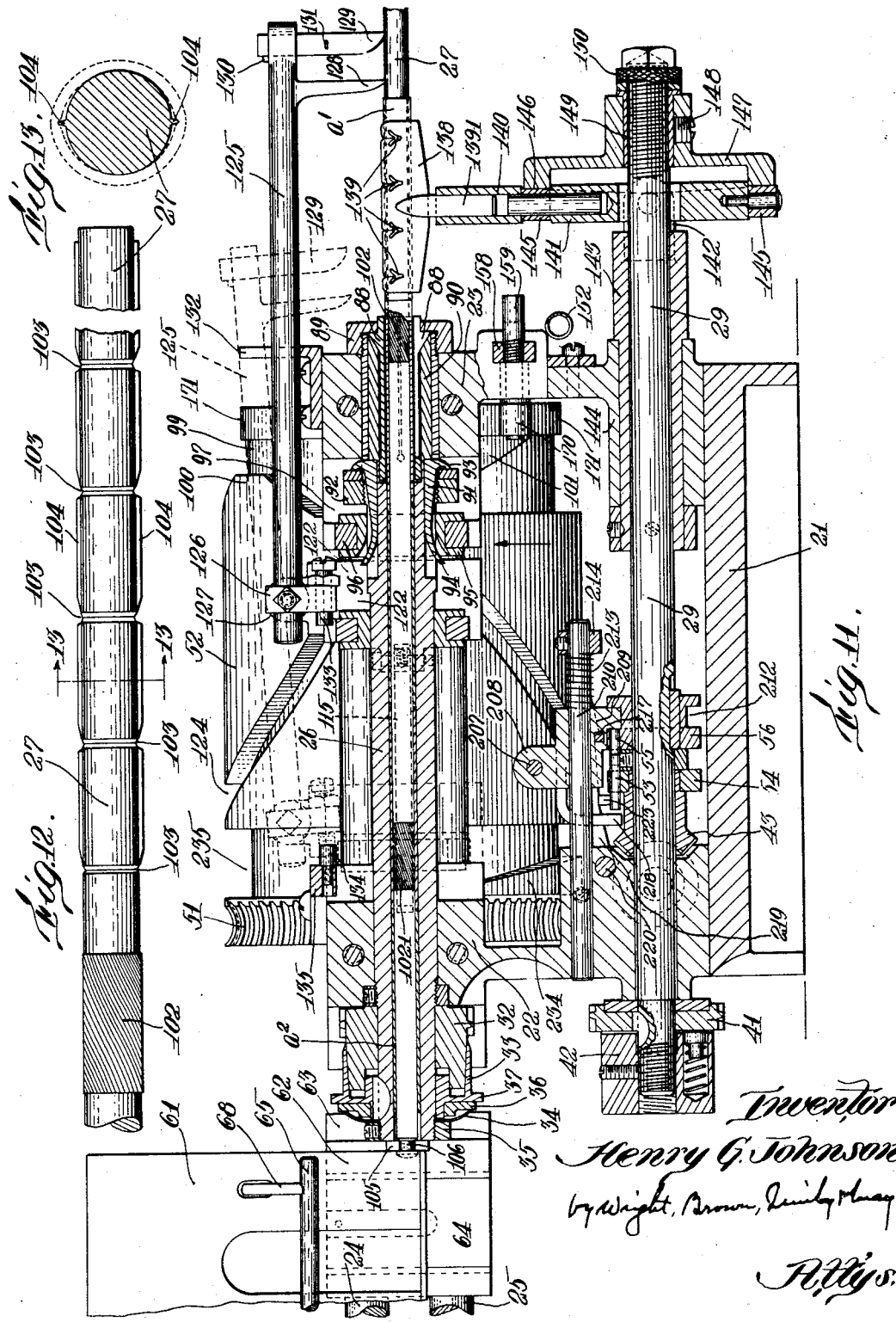

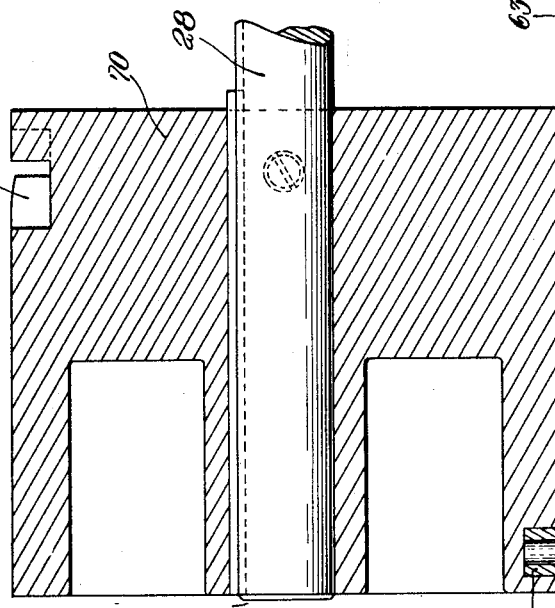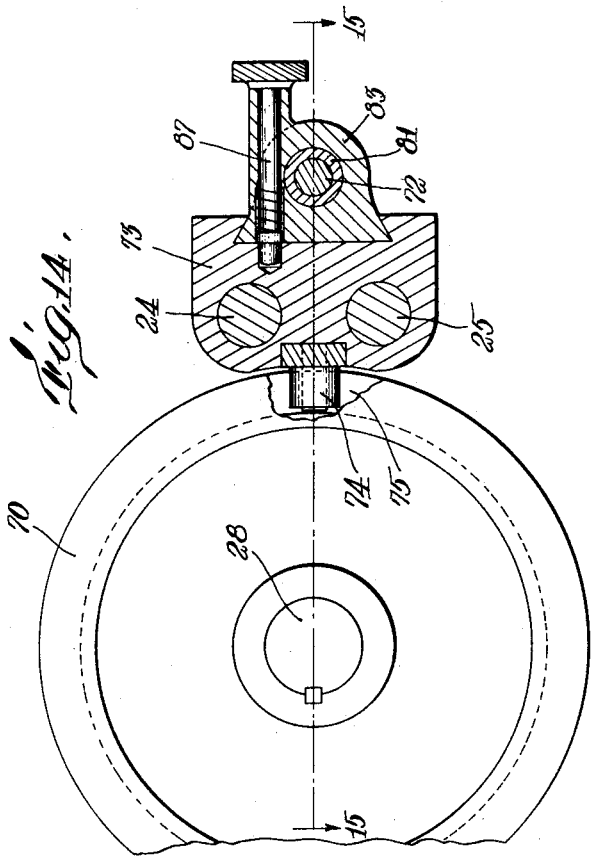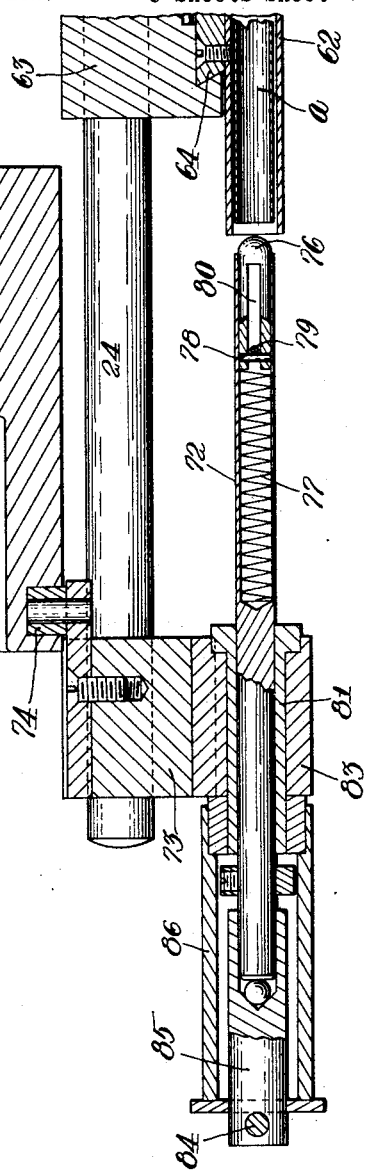

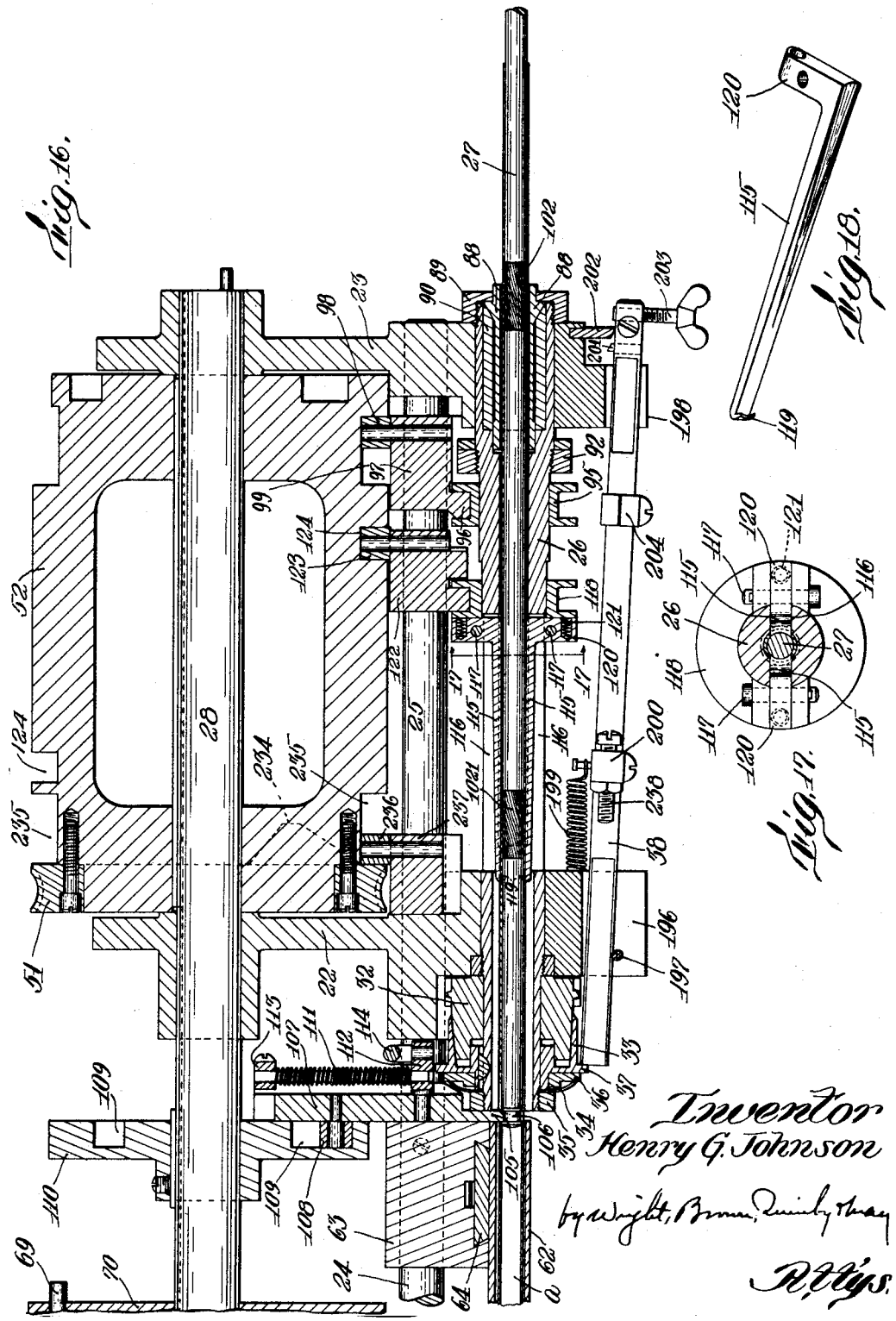

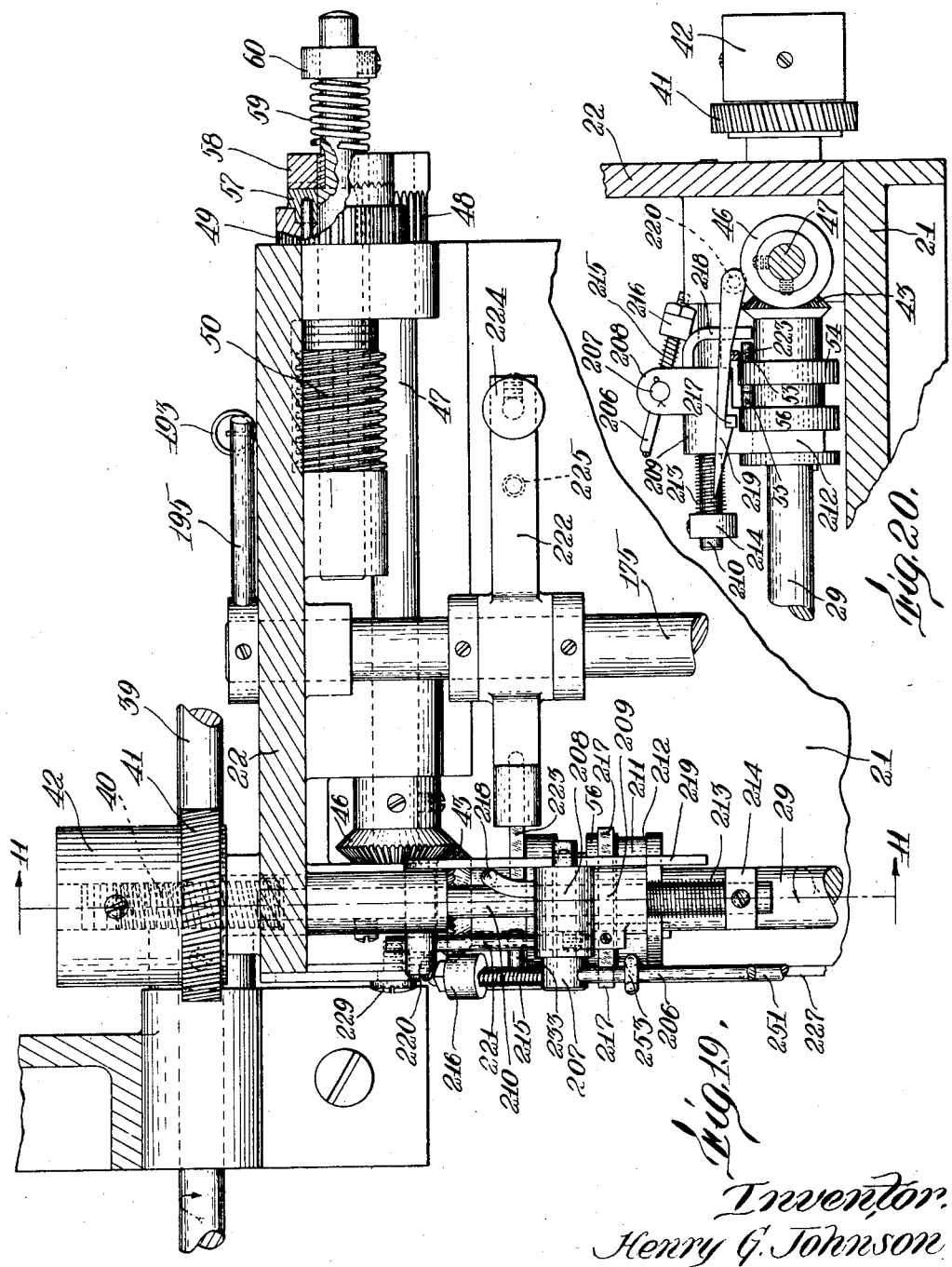

Patented May 16, 1933

1,909,181

UNITED STATES PATENT OFFICE

HENRY G. JOHNSON, OF EAST HAMPTON, CONNECTICUT, ASSIGNOR TO SUMMIT THREAD COMPANY, OF EAST HAMPTON, CONNECTICUT, A CORPORATION OF MAINE

COP WINDING MACHINE

Application filed March 13, 1929. Serial No. 346,605.

This invention relates to machines for winding thread cops. While not limited as to the dimensions of the machines in which it may be embodied, or the dimensions, forms and intended uses of the products of such machines, the invention yet finds one important field of utility in the production of cops adapted for placement in the shuttles of lock-stitch sewing machines used for the commercial manufacture of machine-sewed goods. Such sewing machines are run at high speed, with rapid consumption of thread. Owing to the small size and thread-carrying capacity of their shuttles, frequent replenishment of the shuttle thread is necessary. In the interest of economy the practice has become general of winding thread cops for this and other purposes by automatic machinery on paper tubes.

My invention has for its object to effect greater economy than has been known heretofore in the winding of thread cops, not only for the purpose above particularly mentioned, but for other purposes also, by causing a number of cops to be wound simultaneously on a single core tube, dividing the tube between the different windings of thread to make the individual cops, and feeding new tubular cores on the winding spindle to take the place of finished and ejected cops; all in a continuous, automatic cycle. A further object is to provide a spindle in combination with means for holding it in such manner that tubular cores may be placed upon it at one end and the finished cops removed from the opposite end; all automatically. The manner in which these, and other related, objects are accomplished, and the principles and characteristics in which the invention consists are explained in connection with the following description in detail of a specific machine embodying such principles and characteristics.

Before proceeding with such description, I wish to make it plain that the foregoing reference to cops for use in sewing machine shuttles as the product of the machine is not intended as a limitation of the utility of the invention or of the dimensions and proportions of machines containing the invention or of the products which such machines may produce. Generically, the invention may be applied to the winding of thread of any character in cops of any dimensions containing any desired quantity of thread.

In the drawings herewith furnished for illustration,—

Fig. 1 is a plan view of a specific machine illustrating the invention;

Fig. 2 is an elevation of one side of the machine;

Fig. 3 is an elevation of the machine as seen from the side opposite to that shown in Fig. 2;

Figs. 4 and 5 are cross sections of the machine taken on lines 4—4 and 5—5, respectively, of Figs. 1 and 3;

Fig. 6 is a front end elevation of the machine on a larger scale;

Fig. 7 is a perspective view of the cam by which the oscillating thread guide is oscillated;

Fig. 8 is a rear end elevation of the machine;

Fig. 9 is a cross section taken on line 9—9 of Fig. 3, and an elevation of the parts at the left of such line;

Fig. 10 is a detail elevation of a modified form of cutter for severing the tube on which a number of cops are wound;

Fig. 11 is a vertical longitudinal section taken on line 11—11 of Figs. 1, 9 and 19;

Fig. 12 is a detail elevation, enlarged, of part of the winding spindle;

Fig. 13 is a cross section of the spindle, further enlarged, taken on line 13—13 of Fig. 12;

Fig. 14 is a cross section taken on line 14—14 of Fig. 3;

Fig. 15 is a longitudinal section taken on line 15—15 of Figs. 3 and 14;

Fig. 16 is a horizontal section taken on line 16—16 of Fig. 6;

Fig. 17 is a detail cross section taken on line 17—17 of Fig. 16;

Fig. 18 is a perspective view of one of the feeding elements by which the core tube is advanced on the spindle;

Fig. 19 is a horizontal sectional view showing details of the driving mechanism taken on line 19—19 of Fig. 4.

Fig. 20 is a detail elevation of a latch for one of the clutches of the machine.

Like reference characters designate the same parts wherever they occur in all the figures.

Describing now the specific machine here shown, as representative of various machines in which the invention may be embodied, but without limiting intent; the frame comprises a base 21, upright webs or standards 22 and 23 at opposite ends of the base, and two massive rods or bars 24 and 25 which pass through and are secured in the standards and extend rearward of the standard 22. It may be noted at this point that the front of the machine is considered to be that end where the cops are wound and from which they are discharged, and the rear to be the end from which the feeding of core tubes takes place. As related to the drawings, the lefthand end of Figs. 1 and 2 and the right hand end of Figs. 3, 11 and 16, is the front.

In suitable bearings provided in the standards 22 and 23 are located a tubular shaft 26 containing a mandrel or spindle 27, a cam shaft 28 and an intermediate shaft 29, these shafts all being parallel to the longitudinal (front to rear) dimension of the machine.

Power is delivered to the tubular spindle shaft 26 by a drive shaft 30 (Figs. 2 and 8) through helical gears 31 and 32, the latter gear being loose on the spindle shaft and adapted to be coupled therewith by a clutch 33 (Figs. 11 and 16) splined to the shaft. Said clutch has an internally tapered sleeve which embraces a complementally tapered hub on the gear 32 and is normally pressed into gripping engagement with the gear by spring fingers 34 (see also Fig. 8), which radiate from a collar. Such collar is clamped on the shaft by a nut 35 and the fingers press against a washer 36 contiguous to the end of the clutch member. The clutch member has a lip or flange 37 adapted to receive the thrust of a releasing bar 38, whereby it is disengaged from the gear. Such releasing bar and the means for operating it are later described. Power for driving the intermediate shaft 29 is derived from a power shaft 39 (Figs. 2 and 19) carrying a helical gear 40 which meshes with a complemental gear 41 keyed to shaft 29 and backed up by a collar 42 (Fig. 11) screwed and locked on the shaft. The power or drive shafts 30 and 39 are in turn driven by any suitable means, not shown here, at a definite prescribed speed ratio.

Power for the cam shaft 28 is transmitted from the intermediate shaft 29 through a bevel gear 43 on said shaft, a meshing bevel gear 46 on a transverse shaft 47, a pair of spur gears 48 (on shaft 47) and 49, a worm 50 (Fig. 19) on the same shaft with gear 49, and a worm wheel 51 (Figs. 1, 2, 3 and 16) in mesh with the worm and secured to a cam drum 52 which is keyed to the cam shaft. The bevel gear 43 is loose on shaft 49 but is coupled thereto when need arises for driving the cam shaft, through the medium of a pin 53 constituting one element of the clutch, passing through a collar 54 secured to the bevel gear, and a complemental clutch element in the form of a projecting pin 55 carried by a sleeve 56 splined to the shaft. During the winding action, the clutch elements 53 and 55 are separated, and gear 43 remains stationary, but when the prescribed length of thread has been wound on the cops the clutch members are brought into engagement by shifter means later described.

Gear 49 is loose on the shaft which carries worm 50, but is coupled thereto by the clutch members 57 and 58, the former pinned to the gear, and the latter splined to the worm shaft and pressed toward the former by a spring 59 reacting against a collar 60 on the shaft. These clutch elements have mating teeth on their adjacent surfaces, the sides of which are inclined sufficiently to slip past one another, displacing the element 58 against spring 59, and permit harmless idle rotation of the gear in case an abnormal resistance should oppose rotation of the cam drum. Thus the clutch is a yielding one which serves as a safety device to prevent injury to the feeding means or the work in case the core tubes or finished cops should fail to pass smoothly upon, along and from the spindle.

The core tubes on which the thread is to be wound are contained in a magazine 61 mounted adjacent to the rear end of spindle 27 and having a chute 62 leading from its bottom with dimensions suitable to hold a single upright row of horizontal tubes, as shown in Fig. 3, where the tubes are designated by the letter $a$. The mount for the magazine consists of a block 63 secured to the bars 24 and 25, and a dovetail rib 64 on the back of the chute fitted to a guideway in the block and arranged to permit adjustment of the magazine so that the lowermost tube of the chute is alined with the spindle, as shown in Fig. 16. An agitator 65 is carried by a lever 66, pivoted to a bracket 67 at the rear of the magazine chute (Fig. 8) and has fingers 68 adapted to pass through slots on the front wall of the magazine. The agitator is oscillated by the joint action of pins 69 on the adjacent end of a cam drum 70 and a spring 71, whereby the fingers are caused to jostle the tubes as they enter the chute and place them in orderly arrangement.

A feeder 72 is provided for thrusting the lowermost tube in the chute upon the rear end of the spindle. Such feeder is a rod alined with the spindle and carried by a slide 73 which is adapted to travel on the bars 24 and 25, and carries a roller projection 74 entering a cam groove 75 of the cam drum 70. The forward end of the feeder rod is tubular with approximately the same dimensions as the tube to be fed, and contains a centering stem 76 (Fig. 15) projecting slightly forward to enter the bore of the lowermost tube in chute 62. It is pressed outward by a spring 77 to the limit permitted by the obstructing pins 78 and 79, one of which is mounted in the stem and the other in the pusher rod shell crossing a slot 80 in the stem. Such slot permits the stem to yield when encountering the rear end of the spindle while the shell of the pusher passes onward, and advances the tube fully on to the spindle and beyond the rear end of the latter. The entire pusher rod is movable endwise through its bushing 81 in order that it may yield if it fails to enter the chute or to engage a tube in the chute properly; and it is held up to its work by springs 82 (Figs. 1, 2 and 3) anchored to a block 83 which is fastened to slide 73 and contains the bushing 81. The springs are connected to a cross pin 84 in a bar 85 which passes through the end of a housing 86 and bears on the end of the pusher. The block 83 carrying the pusher and associated parts last described is detachably secured to the slide block 73, having a base which fits a dovetail guideway and being detachably locked therein by a pin 87, as shown in Fig. 14.

The winding spindle 27 is secured to the tubular spindle shaft 26 during winding, and also while a tube is being placed on its rear end, by a chuck at the forward end of the shaft. Such chuck comprises spring jaws 88 (Figs. 11 and 16) surrounding the spindle, set into a recess in the forward end of the shaft, and retained therein by a shouldered nut 89 screwed on the shaft. The jaws have tapered outer surfaces by which they may be crowded against the spindle, or rather against the outside of the core tube surrounding the spindle, by the endwise movement of a sleeve 90, fitted to slide within the end socket or chamber of the shaft and surrounding the clutch jaws, the forward end of which is internally tapered and bears on the tapered backs of the jaws. Angle levers 91 are placed in exterior grooves of the shaft, wherein they are held by a collar 92, and are arranged to bear at their angles on the rear end of sleeve 90, while their short arms 93 bear on the adjacent end face of the collar, or of a washer beside the collar. The long arms 94 of these angle levers are bent outwardly and are surrounded by a loose collar 95 engaged with a fork 96 which projects from a slide 97. Such slide is mounted on the guide bars 24 and 25 and carries a roller projection 98 entering a groove 99 in the cam drum 52. Cam projections 100 and 101 at opposite sides of such groove move the slide first forward and then back during each revolution of the cam drum. The drawing shows it in the forward position, whereby the normal spring tendency of the chuck jaws is permitted to relax their grip. When moved rearward, collar 95 presses inward on the curved arms 94, causing the angle levers to pivot about the engaging points of their short arms 93 with the collar 92, and forcing their angles against the rear end of the jaw closing sleeve 90. The slight movement thus given to the sleeve is sufficient to cause gripping of the spindle.

The spindle is long enough to hold a number of tubes in tandem. As here illustrated, it holds a tube $a'$ in winding position, a tube $a^2$ which has just been placed on its rear end, and three intermediate tubes. It is the forward end of the tube next to the one in winding position which is gripped by the chuck jaws. The part of the spindle surrounded by the chuck has a slight enlargement 102 which is spirally knurled in order to prevent slipping of the tube when torque is transmitted to the spindle. A second knurled portion 1021 is formed on the spindle within the rear end part of the next to the last tube in order to prevent slippage of the latter before being advanced by the intermediate feeders. That part of the spindle which projects forwardly and carries the tube $a'$ in winding position is formed with shallow peripheral grooves 103 to admit the knives by which the tube is severed between the cops, and has longitudinal fins 104 to distort and indent the tube, as indicated by dotted lines in Fig. 13, and prevent slippage of the latter under the back pull of the thread and the frictional resistance of the later described presser.

While the spindle clutch is relaxed to permit feeding forward of a fresh tube into winding position, the spindle is held back by the jaws of a fork 105 (Figs. 5 and 16) which embrace the spindle, entering a groove 106 near its rear extremity. Said fork is carried by the outer end of a slide 107 which is mounted in a guideway on the end of block 63 and carries a roller projection 108 entering a groove 109 in the face of a cam 110 which is secured to cam shaft 28. The spring 111 normally projects the fork into engagement with the spindle, and the cam retracts it at the proper time in the cycle of operations to permit a new tube to be thrust on the rear end of the spindle by feeder 72. The spring acts between a block 112, which is fastened to the side of the slide 107, and an abutment 113 fastened to the guide. A handle bar 114 is secured to block 112 whereby the fork may be manually retracted when it is desired to remove or replace the spindle.

In addition to the feeder previously described for placing tubes on the spindle, which may be called the primary feeder, there are also an intermediate feeder which advances the tubes into winding position, and a discharge feeder or ejector which displaces the finished cops. The intermediate feeder comprises two arms 115 (Figs. 16, 17 and 18) which occupy diametrically opposite slots 116 in the tubular spindle shaft and are connected by pivots 117 to a sleeve 118 which surrounds the spindle shaft and is adapted to slide upon it. Each of these arms has a hook 119 on its extremity and a short arm 120 projecting outward from its pivot formed with a socket in which is a spring 121 pressing against the sleeve 118 and, by its reaction, pressing the hooks toward the spindle. The sleeve 118 has a flange which is engaged by entering a slot in the side of the block, with a slide block 122 adapted to slide on the guide bars 24 and 25 and having a roller projection 123 entering a groove 124 in the cam drum 52. Said groove has an axial displacement sufficient to move the feeder back and forth a distance equal to the length of the tube, or enough greater than this length to insure that, when the arms are retracted, their hooks will catch the rear end of the tube last placed on the spindle by the primary feeder. The drawings show the feeder advanced to its forward limit.

The final or ejecting feeder is a bar 125 secured by a set screw in a block 126 pivoted to a lug 127 (Figs. 1 and 11) on the slide 122, and extending thence toward the forward end of the machine, having two prongs 128 and 129 near its forward end projecting toward the spindle and adapted to rest thereon or on a tube surrounding the spindle. The prong 128 is adapted to drop back of the rearmost cop when lowered from the dotted line position shown in Fig. 11, and the forward or outer prong 129 is provided to engage the next cop and push it forward, without lost motion, in case the intended rearmost cop should fail to be wound, due to breakage of the thread or other accident. It normally rests idly on the rear cop during ejection, and is mounted in a sliding manner in a passage in the end of the bar, whereby it may move endwise between limits established by stops 130 and 131 and permit descent of prong 128 behind the rear cop. A notched lug 132 secured to the forward frame upright 23 locates and guides the bar 125. When the ejector is moved to the rear, an adjustable stop 133 carried by the block 126 at one side of the pivot of the block strikes a stop 134 and causes the forward end of the ejector to be raised. The stop 134 is secured to an arm 135 which is mounted and movable as and for purposes later described.

The thread being wound is taken from spools located in any convenient place, not here shown, through eyes 136 on an adjustable stationary holder 137 (Figs. 1, 6 and 9), to an oscillative thread guide 138 having eyes 139 for the different threads. The guide 138, oscillating continuously while the spindle rotates, causes the separate cops to be independently, simultaneously wound. It has a shank 1391 entering a socket 140 carried by a holder 141 which surrounds the intermediate shaft 29 with ample clearance and is pivoted on a nearly horizontal axis to two lugs 142 (Figs. 6 and 11) extending at opposite sides of the shaft from a bushing 143 which is mounted rotatably in a bearing 144 of the upright 23, and in which the shaft 29 has its bearing, in turn. The holder 141 carries rollers 145 above and below the shaft, which are engaged with a cam rib 146 on a disk 147 (Figs. 7 and 11) which is secured to shaft 29. The cam is symmetrical on opposite sides of its center and so bears simultaneously and at all times on both rolls 145. It thus gives the guide positive movements in each direction at a rate needed to lay the threads in the required manner. In order that the cam may be readily and accurately adjusted for this purpose it is secured frictionally by means of a set screw 148 on a bushing 149 which is screw threaded on the shaft and secured after adjustment by a jam nut 150. The guide 138 is provided with a presser in the form of an integral pad 151 on the side toward the spindle, below the eyes 139 and extending through substantially its whole length. This pad is adapted to bear on the circumference of the cops and is spring actuated to exert a powerful compacting pressure on the thread accumulations by a spring 152 (Figs. 6 and 9) which is coupled at one end to a bar 153 and at its opposite end to an adjustable abutment comprised by a screw 154 threaded through a lug 155 on the upright 23. Bar 153 is stepped at its lower end in a socket 156 on the side of the bushing 143, wherein it is held by a set screw 157. Thus the presser 151 and bar 153 are so connected that force and movement applied to either about the axis of shaft 29 is imparted to the other.

It is desirable that the cops be wound with a truly cylindrical periphery notwithstanding the distortion of the core tube caused by the fins 104 on the spindle. In order to give them this cylindrical form, I have provided an automatic arrester to prevent the presser from following the receding surfaces of the tube and thread windings after having been displaced by the high points, during the building up of the cops. Such arrester consists of a slide 158 fitted to a guideway in the upright 23, having a pin 159 which overlaps the bar 153, and carrying a dog 160 pivoted at 161 to its further end. The dog has an offset tail 162 overlapping an abutment plate 163, which is secured adjustably to the upright 23; the tail thus forming a shoulder 164 arranged to bear on the edge 165 of the plate. The length of the dog from the pivot 161 to the shoulder 164 is greater than the distance from the pivot to the nearest point in the edge 165 when the slide 158 is in the position corresponding to the nearest possible approach of presser 151 to the spindle. Thus the pressure exerted on the slide through spring 152 and the reaction of the abutment plate retain the dog in the inclined position shown in Fig. 9. A spring 165a, connected with the dog and anchored to a part of the plate 163, tends always to swing the dog downward to the limit set by a stop 166. Thus whenever the presser is moved to the left by the high points in the cop, the dog is permitted to slip down slightly along the edge 165 to prevent return of the presser when the next low part of the cop passes it. Thereby the severest pressure of the presser is exerted only on the protuberant parts of the cops, the intermediate parts being relieved from pressure sufficiently to cause them quickly to fill out to the true circular outline. This action continues until the dog has reached a position perpendicular to the edge 165, and by that time enough thread has accumulated on the cops to offer a substantially uniform resistance at all points to the presser, so that in the final stages of winding the outline is preserved.

A hook 167 is provided on the dog to be engaged with a pin 168 projecting from the adjacent end of the cam shaft at one side of the axis thereof for lifting the dog after the finished cops have been ejected, as shown in Fig. 6, thus permitting the presser to return to its position of closest approach to the spindle. A stop screw 169 is adjustable in the upright 23 in line with slide 158 at the right thereof (with reference to Figs. 6 and 9) to limit retraction of the slide, as may be desired. The slide carries also a cam-follower roll 170 arranged to bear on a peripheral cam element 171 on the cam drum 52. A rise 171a of this cam element is arranged to displace the presser from the fully wound cops and the adjacent high dwell to hold it displaced while the ejector acts. A following cam descent 171b permits return of the presser before the next group of cops are wound.

For severing the tubes between cops and cutting the threads which trail from the cops last ejected, I have provided circular disk knives 172 mounted in alternation with spacing sleeves or collars 173 on a bushing 174 carried by a swing frame secured to a shaft 175. The swing frame is preferably made of two frame components, one consisting of a sleeve or hub 176 which is clamped to the shaft, arms 177 extending from said hub, and a guideway 178 on the ends of said arms, which is split lengthwise to convert it into a pair of jaws and is provided with clamp screws 179. The other is a U-shaped frame having a base 180 which fits and is clamped between the jaws of the guideway 178, and upright arms 181 carrying a pivot 182 passing through the bushing 174. Thus provision is made for adjusting the knives lengthwise of the spindle.

The knife carrying swing frame is controlled by cam surfaces 183 and 184 bounding a groove 185 in the forward end of the cam drum 52. This groove receives a follower roll 186 carried by a slide 187, which also carries a projecting adjustable pusher 188 bearing on an abutment 189 carried by the swing frame. The abutment is a rod movable endwise in eyes 190, and pressed by a spring 191 into the path of said pusher. It may be retracted to release the swing frame. A spring 193 at the opposite end of the machine (Fig. 8) is anchored to an eye 194 on the base and connected to an arm 195 secured to the rear end of shaft 175 to take up backlash and exert constant force tending to withdraw the knives from the spindle. After the finished cops have been ejected and a fresh tube placed in winding position, the cam thrusts the knife edges against the tube. Cutting is caused by rolling of the knives in peripheral contact with the rotating tube. In place of knives having a smooth circular edge, I may provide them with notched or serrated edges, as indicated with respect to the alternative knife 172a shown in Fig. 10.

The releasing bar 38 previously mentioned is tripped by the presser 151 when the cops have been built up to the required diameter. Said bar is confined loosely in a forked bracket 196, secured to the upright 22, by a pin 197. It is also guided by a forked bracket 198 on the forward upright 23. A spring 199 is anchored to bracket 196 and connected to a block 200 fastened to the bar, tending to move the latter endwise to the rear. The bar is normally latched in a forward position, as shown in Fig. 16, by means of its latch projection 201 overlapping a stationary blade or plate 202 secured to bracket 198. The end of the bar carries an adjustable abutment screw 203 which (when the bar is latched) is in the path wherein the arm 153 of the presser carrier swings, wherefore the outward movement of the presser caused by enlargement of the cops disengages the release bar from its latched position. By adjustment of screw 203 the cops may be wound to a greater or less diameter before this action takes place.

Release bar 38 also controls the cam driving clutch sleeve 56. To the bar 38 is clamped a block 204 to which is pivoted a perforated block 205 (Fig. 3). A rod 206 passes through the block 205 and also through a block 207, having a shank connected in a swiveled manner to a lug 208 (Figs. 11 and 19) on a block 209 which is mounted slidingly on a rod 210, the latter being fastened in the standard 22 and parallel to shaft 29. The block 209 has a projection or a fork 211 occupying a groove 212 in sleeve 56, whereby movement of the block serves to shift the sleeve. A spring 213 surrounds the rod 210, being confined betwen block 209 and a collar 214 on the rod, and tends to shift the block into position for engaging the clutch members 53 and 55. However, a more powerful spring 215 (Figs. 3 and 19) is confined between a collar 216 on rod 206 and the swiveled block 207, being effective to disconnect the clutch members 53, 55 when the release bar is moved to its latched position.

The block 209 also carries a pin or rod 217 projecting to either side, as shown in Fig. 19, and a rearwardly and downwardly extending finger 218. Such pin or rod cooperates with a latch bar 219 to secure the block in clutch coupling position. Said latch bar is secured to a pivot 220 which is swiveled in a lug of the fixed upright 22 and carries a bent trigger arm 221. The weight of the latch bar and trigger arm normally causes the shoulder of the latch bar to drop in front of the pin and hold the clutch member 55 in overlapping relationship with the complemental clutch member 53.

A lever 222 is pivoted on the shaft 175 and has a finger 223 extending under the latch bar. One arm of the lever extends under the cam drum 52, having an adjustable abutment 224 which bears against the under side of the cam drum, being pressed upwardly against the same by spring 225 (Fig. 4). Thus, as the abutment and the finger are at opposite sides of the axis of the lever, the finger 223 is normally depressed. A projection 226 is arranged on the cam drum in position to depress the abutment 224 at a given point in the rotation of the drum, thereby raising the finger and releasing latch 219.

The finger 218 is a stop to arrest rotation of the gear 43 and therefore of the cam shaft, when the clutch has been disconnected. For this purpose its extremity is arranged adjacent to the rearwardly extending end of clutch pin 53, so that it clears the pin when the clutch is connected, but stands in the path of the pin when the clutch is disconnected.

In order to release the clutch manually at will, I have provided a bar 227 having slots 228 through which screws 229 pass to secure it to the machine base with provision for endwise movement. A spring 230 normally holds it in the position shown in Fig. 3. It has a handle 231 by which it may be grasped and moved against the tension of the spring. On the slide bar 227 is an upright 232 carrying a pin 233 which passes under the bent trigger arm 221, a downwardly inclined portion of said trigger arm extending forwardly from the pin. Hence when the slide bar is moved forward manually the trigger arm 221 is lifted, raising the latch bar 219 and releasing the sleeve 56. Before the slide bar reaches the limit of its movement, its upright 232 engages the outwardly projecting end of pin 217 and retracts block 209 and the clutch element 55 against the opposition of spring 213. At the same time the stop finger 218 is brought into action to arrest the driving gear 44. Automatic setting of the release bar 38 is accomplished by a cam surface 234 at one side of the groove 235 in the cam drum 52. This cam surface acts on a roll 236 on the slide 237 to which the previously mentioned arm 135 is secured. Arm 135, coming to bear on an adjustable abutment 238 carried by the block 204 on release bar 38, shifts the bar forward to the position where its latch 201 catches over the latch plate 202; thus allowing the spindle driving clutch 33 to be coupled with gear 32, and putting the spring 215 under stress ready to separate clutch element 55 from 53 when the cam projection 226 causes release of latch bar 219.

The operation of the machine will now be described.

The intermediate shaft 29 is in continual rotation, and the rotation of the spindle shaft and the cam shaft is intermittent. While winding goes on, the release bar 38 is in latched position, permitting clutch 33 to drive the spindle shaft. As the spindle and intermediate shaft are driven at a prescribed suitable speed ratio to one another (by means not shown here) the thread laying guide is caused by the cam 147 to lay the threads being wound in back and forth helices on the cops. The presser pad 151 of the thread guide continually presses on the cops and is moved slightly farther outward each time the protuberant parts of the tube and of the thread accumulation pass by them. When the cops have been built up to the prescribed diameter, which may be varied, within limits, by the abutment screw 203, the release bar is tripped by the abutment bar or arm 153 from its latched position, and is moved suddenly rearward by spring 199. It sharply strikes and then presses on the flange of clutch 33, releasing the spindle driving gear, and at the same time relaxes the pressure of spring 215, whereby the spring 213 is enabled to couple the cam driving clutch 53, 55.

The cam shaft is thus set in rotation. The first action of the cam is to shift the presser clear of the cops, which is done by the cam projection 171a. Then the cam projection 100 moves slide 97 forward to release the chuck jaws 88. Immediately thereafter, or almost at the same time, the slide block 122 is moved forward, advancing the ejector 125 to discharge the finished cops, and the intermediate feeder 115 to advance all the empty tubes on the spindle one stage further forward, placing a fresh tube in winding position. The drawings, all except Fig. 9, show the machine at this stage of its cycle, the cams having completed about one-quarter of a revolution. During the next quarter turn of the cams, the dog 160 is raised by pin 168, the presser is permitted by the cam descent 171b, and caused by spring 152, to return to the spindle, the knives 172 are brought forward against the tube now in winding position, the chuck jaws 88 are again clamped upon the spindle and the tube thereon by the cam projection 101, and the ejector and intermediate feeders are brought to their rearmost position by cam groove 124.

After the spindle has been thus grasped by the chuck, the fork 105 is withdrawn by cam 110 from its position of engagement with the spindle, which it had occupied up to that time, and the pusher or primary feeder 72 is advanced by cam 70 to shift a tube from the magazine chute on to the rear end of the spindle, and withdrawn; and the fork is again engaged with the spindle. These last steps occur in the order named and may be commenced immediately following the closing of the chuck jaws 88, regardless of whether or not the cam has completed its second quarter turn. All the time, the agitator 65 is being vibrated to jostle the tubes in the magazine.

Also during the second quarter turn, that is, immediately after the chuck jaws have grasped the spindle, the cam element 234 comes into action, moving the slide block 237 forward and shifting the release bar 38 into its latched or set position. This allows the clutch 33 to become coupled with the gear 32 and to put the spindle in rotation. It also puts spring 215 under tension between the abutment 216 and the slide 209, making it potentially effective to uncouple the cam driving clutch 53, 55, but not actually uncoupling this clutch because the slide 209 is locked by latch 219 in the clutch connecting position. Preferably this action is performed as soon as possible after the wound cops have been displaced and a fresh tube placed in winding position, in order that the next winding action may be commenced immediately, without the loss of time which would result if the winding action were delayed until the cams had completed their rotation. It occurs during the action of the pusher 72 in transferring a tube from the magazine to the rear end of the spindle; this transfer being accomplished equally well whether the spindle is rotating or stationary at the time.

Advance of the cutters 172 to divide the tube between the several cop windings occurs immediately after the spindle has been set in rotation, being accomplished by the cam surface 183. This cam has a rise 183a located to advance the knife carrier into the position shown in Fig. 9 at the above mentioned point in the cycle, a high dwell which holds the knife carrier in this location during somewhat more than half the rotation of the shaft, and a descent 183b which permits retraction of the knives just before the cam driving clutch is disconnected. The rest of the cam surface consists of a low dwell 183c which allows the knives to be retracted, as shown in Fig. 6, during the discharge of the full cops and advance of fresh tubes.

The knives sever not only the tube, but also the threads trailing from the wound and displaced cops. It is obvious that, as the cops are displaced from winding position, they pull threads after them from the guide 138. It will be noted also that the spindle extends beyond the advanced position of the ejector far enough to support the displaced cops. The latter therefore are rotated when the spindle is again set in rotation and start the windings of thread on the newly placed tube. Advance of the knives is delayed until enough turns of thread have been wrapped about the new tube to make the windings secure. Then the threads between the old and new cops are severed.

When the newly completed cops are displaced, those still remaining on the outer end of the spindle are pushed off into a trough 240, which is supported adjustably by an adjustable bracket 241 projecting from the machine base. The ends of the threads trailing from these cops and covered by the cops of the next series are readily pulled out from beneath the latter, and are secured so that the finished cops will not unwind, and trimmed off, in the usual way.

When the cam shaft has completed its rotation, the projection 226 on cam drum 52 moves lever 222 and releases latch 219, allowing the cam driving clutch to be disconnected. Then the cams stop, but the spindle goes on turning until the cops have grown to the predetermined size, when they cause the release bar 38 to be tripped, completing the cycle of the machine and starting a repetition of the cycle.

It is apparent from what has gone before that the cycle of the machine, while definite and mechanically positive as to that part of it controlled by the cams, is yet flexible and adjustable as a whole, due to the initial control by the diameter of the cops being wound. That is, the cams are not set in action until a prescribed quantity of thread is wound, and this quantity may be easily varied and controlled by a simple adjustment of the abutment screw 203. As a large proportion of the rotation of the cams takes place simultaneously with the winding action of the spindle, and the latter is stopped only long enough to permit displacement of wound cops and substitution of fresh tubes, there is no unavoidable time loss in the cycle. And as the entire cycle is automatic, a high rate of production is assured. An important factor in this result is the arrangement of the spindle to receive tubes at one end and discharge cops at the other, with means (chuck 88 and hold-back fork 105) alternately acting to secure and release the spindle at different points to permit reception and advance of the tubes.

The machine may be stopped at any time, to tie a broken thread or to make other repair or adjustment, by pulling the slide bar 227 forward and releasing the bar 38 from its latched position, or by moving the slide bar 227 alone. Reconnection of the cam driving clutch while the bar 38 remains latched may be effected by pushing rearward on a knob 250 which is mounted on a rod 251 (Fig. 3). The latter extends through a guide 252 (Fig. 6) fast on the machine and is formed with an eye 253 (Fig. 19) surrounding rod 206 near the swiveled block 207, adapted to slide on the rod 206 and press on block 207, shifting the clutch sleeve 56 into coupling position.

It is to be understood that the principles of the machine thus described may be embodied in other forms differing more or less widely in superficial appearance from the forms herein described, without departing from the spirit and scope of the invention.

What I claim and desire to secure by Letters Patent is:

1. A thread winding machine comprising a spindle, means for placing core tubes on one end of said spindle, means for feeding the tubes so placed lengthwise of the spindle, and means for holding and releasing the spindle alternately at separated points while such placement and feed, respectively, of tubes occurs.

2. A thread winding machine comprising a spindle, means for placing core tubes on one end of said spindle, means for feeding the tubes so placed lengthwise of the spindle, and means for holding and releasing the spindle alternately at separated points while such placement and feed, respectively, of tubes occurs, one of said last named means being rotatable and imparting rotation to the spindle.

3. An automatic thread winding machine comprising a tubular spindle shaft, a spindle within said shaft adapted to receive core tubes for thread windings, a chuck carried by said shaft for grasping and rotating the spindle, a primary feeder arranged to place tubes on the rear end of said spindle, a secondary feeder for transferring tubes so placed past the chuck, means for releasing and closing the chuck on the spindle, a hold-back device located to hold the spindle at a point in rear of the position in which tubes are placed by said primary feeder, and means for disengaging said hold-back device while tubes are being so placed by the primary feeder and for causing it to hold the shaft when the chuck is released.

4. An automatic machine for winding thread on core tubes comprising a spindle, means for placing tubes successively on the spindle at one end, means acting alternately with said means for feeding the tubes so placed along the spindle and discharging thread filled tubes from its opposite end, and means for rotating the spindle and restraining it against axial displacement while tubes are being so placed and fed.

5. A machine for automatically winding thread on tubes, including a spindle, means for supporting and rotating the spindle, means for placing tubes on one end of said spindle, and means for grasping and releasing the spindle alternately in front of and behind the tubes successively placed on the spindle.

6. A machine for simultaneously winding a plurality of separate thread cops, comprising a spindle adapted to hold core tubes, means for rotating said spindle, an oscillating thread guide having different passages for the several threads to be wound, means for vibrating said thread guide to lead the different threads back and forth in paths beside one another, a gang of knives, means to advance said knives toward the spindle between the locations of the several thread windings for cutting the tube between cops, and means for progressively feeding fresh tubes into winding position and displacing the finished cops, all in the same direction lengthwise of the spindle.

7. An automatic machine for winding simultaneously a plurality of separate thread cops, comprising means for supporting and rotating tubes, means for laying threads side by side on a tube in winding position, means for severing the tube between the cop windings thereon, and means for feeding tubes successively into winding position and displacing the finished cops therefrom.

8. A winding machine of the character indicated comprising a spindle adapted to hold a tube, means for rotating said tube, means for guiding and laying a number of threads in separate windings on said tube side by side along the length of the tube, means for cutting the tube between adjacent windings, and means for displacing the wound and cut tubes from winding position and placing a blank tube in such position.

9. A winding machine comprising a spindle adapted to hold a tube on which thread is wound, means for rotating said spindle, means for guiding thread to said tube while the latter is rotated, intermittently operative mechanism for discharging a wound tube and placing a blank tube in winding position, and means controlled by the accumulation of thread being wound for setting said mechanism into operation.

10. A winding machine comprising a spindle adapted to hold a tube on which thread is wound, means for rotating said spindle, means for guiding thread to said tube while the latter is rotated, intermittently operative mechanism for discharging a wound tube and placing a blank tube in winding position, and means controlled by the accumulation of thread being wound for setting said mechanism into operation, said mechanism including self-actuated means for terminating its action at the end of a predetermined cycle.

11. A winding machine comprising a rotatable spindle adapted to carry and be surrounded by a thread tube, means for rotating said spindle and tube, a presser held by yieldable force against the accumulation of thread being wound on said tube and adapted to be displaced by the enlarging accumulation, mechanism for ejecting wound tubes from winding position and placing blank tubes in such position, driving means for said mechanism, a disconnectible clutch between the last named driving means and said mechanism, and means operated from said presser for causing coupling of said clutch from an uncoupled condition when the thread accumulation has acquired a predetermined dimension.

12. In a winding machine of the character described, a spindle adapted to carry, in enveloping relationship, a thread tube, means for rotating said spindle to wind thread on said tube, the spindle having lateral projection to engage the tube and prevent slipping thereof during rotation, a presser yieldingly urged to bear on the thread accumulating on said tube, and means to arrest return movement of said presser toward the tube after displacement thereof by high portions of the thread accumulation, comprising an arrester engaged with the presser at the side thereof toward which the presser is thus yieldingly actuated, a dog pivoted to the arrester, and an abutment having an extended length transverse to the movement of the arrester in position to block the dog.

13. In a machine of the character described, a rotatable spindle adapted to hold, in enveloping position, a thread-receiving tube, said spindle having outwardly projecting vanes at opposite sides to distort the tube and compel rotation thereof with the spindle, a yieldingly actuated presser arranged to press against the accumulation of thread being wound on the tube, and means to prevent return of said presser toward the low parts of the tube after being displaced outwardly by high parts of the thread accumulation, comprising an arrester engaged with the presser at the side thereof toward which the presser is thus yieldingly actuated, a dog pivoted to the arrester, and an abutment having an extended length transverse to the movement of the arrester in position to block the dog.

14. In a machine of the character described, a tube pusher adapted to transfer a thread tube from a magazine to a position on and surrounding a winding spindle, comprising a bar arranged and movable in substantial alinement with the spindle between a position separated from the spindle by a distance great enough to receive a thread tube, to a position overlapping the end of the spindle, said pusher having a recess in its end adapted to admit the end of the spindle when advanced to its last named position.

15. A pusher as set forth in claim 14 having in its end recess a slidably mounted plunger spring pressed to protrude partially from the pusher and having a form and dimensions such that it may enter the interior of the tube being engaged and propelled by the pusher.

16. In a winding machine, a spindle adapted to receive tubes on which thread is wound, a primary feeder for placing such tubes on one end of said spindle, and a secondary feeder for advancing the tubes so placed along the spindle into winding position.

17. In a winding machine as set forth in claim 16, a secondary feeder comprising an arm having a hook adapted to overlap the rear end of the tube placed on the spindle by the primary feeder and a carrier movable back and forth lengthwise of the spindle to which said arm is connected.

18. In a winding machine of the character set forth, the combination with a spindle adapted to hold tubes on which thread is to be wound, of a coaxial rotatable driver for said spindle having means for grasping it, a primary feeder for placing tubes on said spindle, and a secondary feeder for transferring the tubes so placed along the spindle to winding position, said secondary feeder comprising a carrier sleeve surrounding said driver and movable axially thereof, and a pair of arms pivoted to said carrier at either side of the spindle passing through openings in the driver, having hooks to engage the tubes placed on the spindle and being spring pressed into such engagement.

19. In a winding machine, a winding spindle adapted to carry tubes on which thread is wound, rotatable cams at one side of said spindle, means driven by said cams for placing tubes in winding position on said spindle and removing the tubes therefrom after winding, means for driving said spindle and cams including independently releasable and connectible clutches, a trip adapted to be held in a latched position while the winding proceeds, means for releasing said trip from latched position when a predetermined amount of thread has been wound, means whereby said trip then disconnects the spindle driving clutch and causes coupling of the cam driving clutch, and means operated by said cams for returning the trip to latched position, whereby the spindle driving clutch is recoupled and the cam driving clutch is disconnected.

20. In a machine of the character described, a normally rotating shaft, an intermittently rotatable collection of cams, a disconnectible clutch for transmitting power from said shaft to said cams, a trip member placeable in latched position, yieldable force-applying means tending to shift said trip into a different position, means operated by accumulation of thread being wound for releasing the trip from latched position, means through which said trip when in latched position exerts force tending to uncouple said clutch, yieldable means less powerful than the last named means acting in opposition thereto tending to couple the clutch, a latch automatically operable to hold said clutch in coupled position after placement in such position, and means operated by an element of said cams for releasing the last named latch at the conclusion of a cycle of the cams.

21. In a plural cop winding machine, a spindle, means for guiding a plurality of threads side by side to said spindle and laying them in separate windings, and means for ejecting the wound cops from the winding position comprising a bar movable back and forth lengthwise of the spindle, said bar having two prongs projecting toward the spindle, one of which is located back from its end and is adapted to engage the rearmost cop, while the other is located nearer to the end and is displaceable in the direction of its own length and transversely of the bar, and means for separating the said end of the bar from the spindle when the ejector is retracted preparatory to ejecting the cops.

22. A machine as and for the purpose set forth comprising a holder for core tubes, means for rotating said holder and means for guiding thread thereto, whereby to wind thread on a tube carried by the holder in winding position, feeding instrumentalities for delivering tubes to said holder and for locating the tubes in winding position with respect thereto, means for operating said instrumentalities, and control means governed by accumulation of the thread being wound for putting said operating means into action.

23. A machine as and for the purpose set forth comprising a tube holder, means for rotating said holder, means for guiding thread to said holder in a manner to cause winding of thread on a tube carried by said holder in winding position, instrumentalities for placing empty tubes on said holder in winding position and for removing filled tubes therefrom, driving means including a disconnectible clutch for operating said instrumentalities, a presser arranged to bear on the accumulation of thread being wound and being displaceable by the increasing accumulation, a trip controlled by said presser for causing connection of said clutch when the accumulation of thread has reached a predetermined quantity, and means operated by said driving means for disconnecting said clutch after completion of a cycle of operations by said instrumentalities.

24. In a machine of the character described, a spindle driving disconnectible clutch normally in connection, cam means for operating the tube placing, releasing and feeding means of the machine, driving mechanism for said cam means including a connectible and disconnectible clutch, a trip, a trip operator governed by accumulations of thread being wound, means by which said trip when influenced by said operator disconnects the spindle driving clutch and connects the cam driving clutch, and means controlled by said cam means for placing said trip in potential operative position and disconnecting the cam driving clutch.

In testimony whereof I have affixed my signature.

HENRY G. JOHNSON.